US008249327B2

(12) United States Patent
Liu et al.

(10) Patent No.: US 8,249,327 B2
(45) Date of Patent: Aug. 21, 2012

(54) METHOD FOR DETECTING MONETARY BANKNOTE

(75) Inventors: Xu-Hua Liu, Beijing (CN); Chung-Chieh Kuo, Taipei (TW); Young-Min Kwak, Gardena, CA (US); Ying-Jieh Huang, New Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 0 days.

(21) Appl. No.: 13/204,730

(22) Filed: Aug. 8, 2011

(65) Prior Publication Data

US 2011/0286655 A1 Nov. 24, 2011

Related U.S. Application Data

(62) Division of application No. 12/102,030, filed on Apr. 14, 2008, now Pat. No. 8,094,917.

(51) Int. Cl.
*G06K 9/00* (2006.01)

(52) U.S. Cl. ........................................ 382/135; 382/165

(58) Field of Classification Search .................. 382/100, 382/135, 165, 199, 203, 226, 227; 356/71; 194/207; 434/110
See application file for complete search history.

(56) References Cited

U.S. PATENT DOCUMENTS

| | | | | |
|---|---|---|---|---|
| 6,621,919 | B2 | 9/2003 | Mennie et al. | 382/135 |
| 8,094,917 | B2 * | 1/2012 | Liu et al. | 382/135 |
| 2002/0044677 | A1 | 4/2002 | Fox | 382/135 |

* cited by examiner

*Primary Examiner* — Andrew W Johns
(74) *Attorney, Agent, or Firm* — Winston Hsu; Scott Margo

(57) ABSTRACT

A method for detecting an image corresponding to at least a monetary banknote is provided. The method includes selecting a detection procedure from a plurality of different detection procedures, and verifying the image according to the selected detection procedure.

20 Claims, 7 Drawing Sheets

| | | |
|---|---|---|
| #define Currency Type1 | ( 1 << 0 ) | //1 for Currency Type1 |
| #define Currency Type2 | ( 1 << 1 ) | //2 for Currency Type2 |
| #define Currency Type3 | ( 1 << 2 ) | //4 for Currency Type3 |
| #define Currency Type4 | ( 1 << 3 ) | //8 for Currency Type4 |
| #define Currency Type5 | ( 1 << 4 ) | //16 for Currency Type5 |
| #define Currency Type6 | ( 1 << 5 ) | //32 for Currency Type6 |
| #define Currency Type7 | ( 1 << 6 ) | //64 for Currency Type7 |
| #define Currency Type8 | ( 1 << 7 ) | //128 for Currency Type8 |

FIG. 7

METHOD FOR DETECTING MONETARY BANKNOTE

CROSS REFERENCE TO RELATED APPLICATIONS

This application is a divisional of U.S. patent application Ser. No. 12/102,030, filed on Apr. 14, 2008, now U.S. Pat. No. 8,094,917, and included herein by reference.

BACKGROUND OF THE INVENTION

1. Field of the Invention

The present invention relates to an image processing method, and more particularly, to a method for detecting monetary banknotes.

2. Description of the Prior Art

Automated identification and verification of known currency bills is a practical application when applied to retail and business environments. Electronic verification of known bill types helps to increase security in monetary transactions, and also prevents vendors from receiving counterfeit currencies. The currency detectors available today typically scan an image of a sample currency, from which a series of tests is performed in order to determine the validity of the sample. The tests used can include the identification of known currency sections or landmarks, holograms, reflective areas, printing patterns, and texture patterns.

However, with advancements and availability of printing technologies, the occurrence of counterfeit currency or illegally copied currency has increased. Counterfeiters nowadays have access to sophisticated equipment and methods to duplicate known currencies that are virtually indistinguishable to the human eye and to the touch.

Improvements in graphics and image duplication systems, which can include scanners, digital color copiers, and printing machinery and apparatuses, has also contributed to the increase in illegal counterfeit reproduction of various items. Counterfeiters nowadays commonly attempt to reproduce monetary banknotes such as currencies, stocks, bonds, and other valuable items for personal gain and profit. The task of distinguishing and discerning between legitimate items and copied fakes is becoming increasingly difficult as printing and reproduction improvements allow copiers to reproduce banknotes that are virtually identical to legitimate ones. Therefore, there is a need to be able to effectively and precisely discern and distinguish counterfeit monetary banknotes from authentic ones.

SUMMARY OF THE INVENTION

Therefore, one objective of the claimed invention is therefore to provide a method for detecting monetary banknotes.

In accordance with an exemplary embodiment of the claimed invention, a method for detecting an image corresponding to at least a monetary banknote is disclosed. The method comprises selecting a detection procedure from a plurality of different detection procedures, and verifying the image according to the selected detection procedure.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 shows an illustration of a bit-wise currency type definition table.

DETAILED DESCRIPTION

Figure 1:
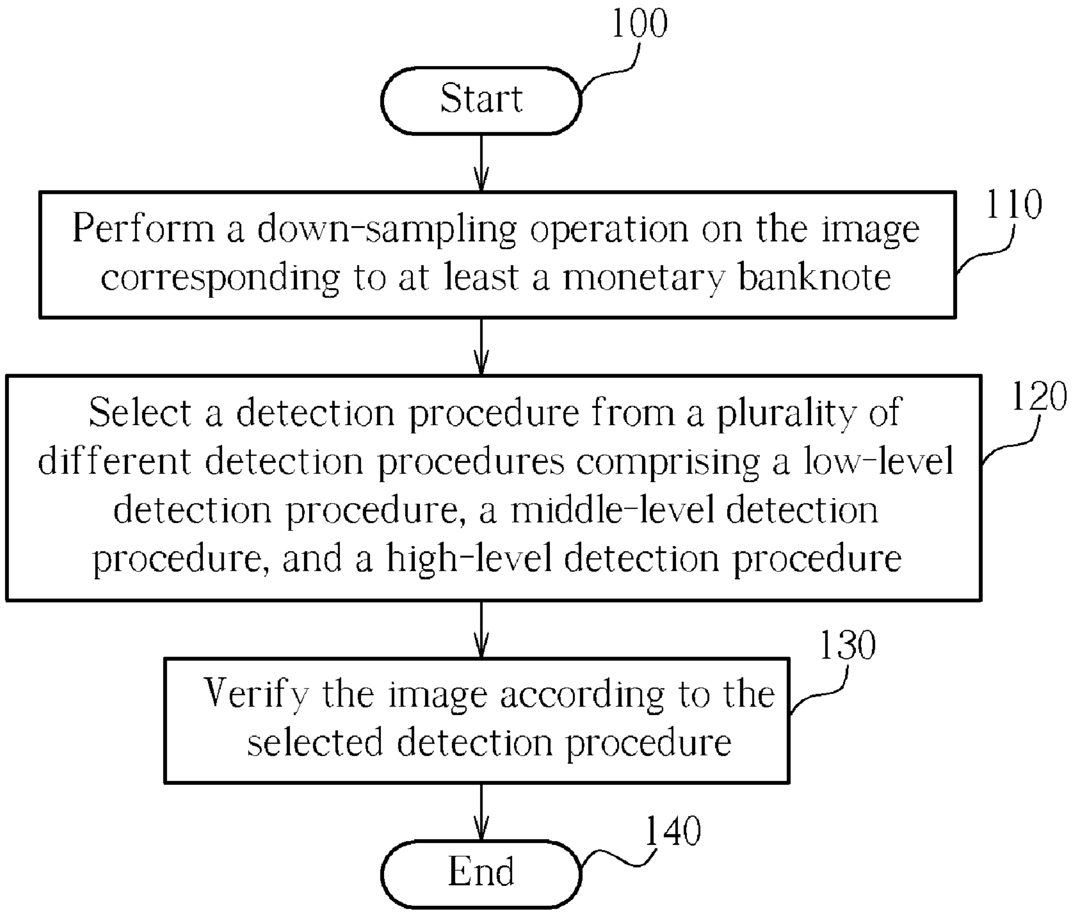
FIG. 1 is a flowchart of a method for detecting an image corresponding to at least a monetary banknote in accordance with an embodiment of the present invention.

The present invention relates to a method for detecting monetary banknotes and a method for performing currency type analysis operation, and this document will describe several exemplary embodiments that apply the method of the present invention. However, a person of average skill in the pertinent art should understand that the present invention can be applied to various types of monetary banknotes and is not limited to the particular embodiments described in the following paragraphs or to the particular manner in which any features of such embodiments are implemented.

In general, the method of the present invention can be applied to all kinds of monetary banknotes. For example, the method of the present invention can be applied to European currency, Chinese currency, Taiwanese currency, American currency, and Japanese currency. However, this is only for illustrative purposes and is not meant to be a limitation of the present invention. In addition, under conditions not affecting the technical disclosure of the present invention, the European currency, Chinese currency, Taiwanese currency, American currency, and Japanese currency will be used in this document as examples to illustrate the operation principles of the method according to the present invention.

The present invention contained herein provides a method for detecting an image corresponding to at least a monetary banknote and a method for performing a currency type analysis operation on an image corresponding to the monetary banknote. The image can be provided from a hardware scanner or a similar device, where the image can contain sample monetary banknotes of a predetermined currency type. The types of currencies can include European, Chinese, Taiwanese, American, and Japanese currencies, but additional embodiments can also include currencies of other nationalities.

The described method can be applied for use in the prevention from counterfeiting currency. The scanned image can provide the sample monetary banknotes with an arbitrary rotational shift alignment within the image. This allows a common scanner to be used, instead of a simple banknote reader with fixed input dimensions. Additionally, the scanned image can contain the sample monetary banknotes while superimposed onto an arbitrary background, can contain multiple isolated or independent banknotes, or have overlapping banknotes. The method can be used in conjunction with basic stand-alone scanners, copiers, stand-alone printers, and other related detection and scanning hardware.

The method described in this present invention makes use of new innovations not introduced by the prior art. This not only provides an increased means of security measures when used for anti-counterfeit banknote, it also provides ease of integration with common hardware devices and a viable low-cost approach. It is also robust and flexible enough to be applied to a wide variety of image types and conditions.

Prior to a concise description of the present invention verification method, it is important to understand that certain terms used throughout the following description and claims will refer to particular processes or steps. As one skilled in the art will appreciate, designers may refer to such processes by different names. This document does not intend to distinguish between items that differ in name but function. In the following discussion and in the claims, the terms "including" and "comprising" are used in an open-ended fashion, and thus should be interpreted to mean "including, but not limited to . . . ". Other examples are equally applicable, and should be understood to those familiar with the proper terminology of the related art.

Please refer to FIG. 1. FIG. 1 is a flowchart of the method for detecting an image corresponding to at least a monetary banknote in accordance with an embodiment of the present invention. Provided that substantially the same result is achieved, the steps of process need not be in the exact order shown and need not be contiguous: other steps can be intermediate. The present invention method comprises:

Step 100: Start.

Step 110: Perform a down-sampling operation on the image corresponding to at least a monetary banknote.

Step 120: Select a detection procedure from a plurality of different detection procedures comprising a low-level detection procedure, a middle-level detection procedure, and a high-level detection procedure.

Step 130: Verify the image according to the selected detection procedure.

Step 140: End.

The low-level detection procedure is utilized for determining whether the monetary banknote is a valid currency or not. The middle-level detection procedure is utilized for determining the currency type of the monetary banknote. The high-level detection procedure is utilized for determining the currency type and currency value of the monetary banknote.

The resolution issue is quite important, as there are several resolutions (100 dpi, 200 dpi, 300 dpi, 400 dpi, 600 dpi, 800 dpi, and 1200 dpi etc.) that the scanner can support. In order to detect all the resolutions of the images corresponding to the monetary banknotes, the present invention method can use several down-sample algorithms to down-sample images with any resolution to a single fixed resolution, and then analyze the down-sampled image using the following detection procedures.

Figure 2:
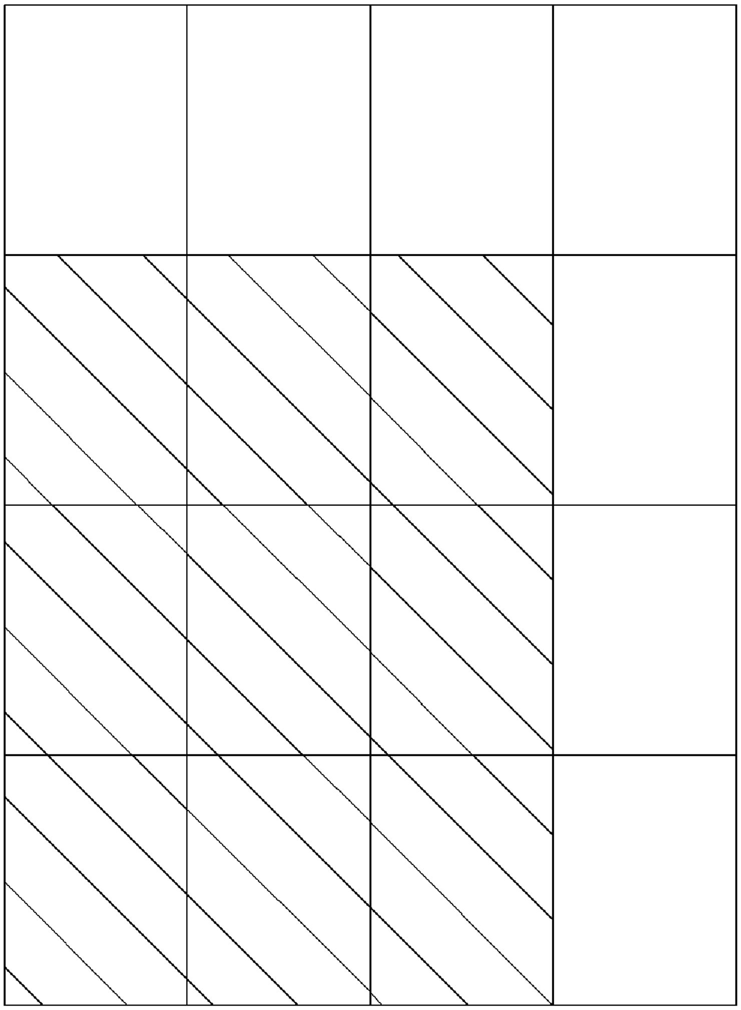
FIG. 2 shows an illustration of a 4×4 to 3×3 down-sample algorithm.

For example, there are two kinds of down-sampling algorithms. One is 4-to-1, which means a 2×2 pixel block is down-sampled to 1 pixel, used for down-sampling from 600 dpi to 300 dpi, 800 dpi to 400 dpi, or 1200 dpi to 600 dpi. The other is 4-to-3, which means a 4×4 block is down-sampled to a 3×3 block, used for down-sampling from 400 dpi to 300 dpi, etc. For a 4-to-1 algorithm, it simply chooses the upper-left pixel of the 2×2 block as the target pixel. For a 4-to-3 down-sample, the 400 dpi image should be down-sampled to 300 dpi first and the target block size should be 16, but because this does not divide evenly, a 64×64 block from 400 dpi image is extracted and then down-sampled to a 48×48 block. Here, one uses a 4-to-3 down-sample algorithm, and analyzes 3×3=9 16×16 blocks to do the color analysis. Please refer to FIG. 2. FIG. 2 shows an illustration of 4×4 to 3×3 down-sample algorithm, wherein the shading area is the target block after being down-sampled.

Figure 3:
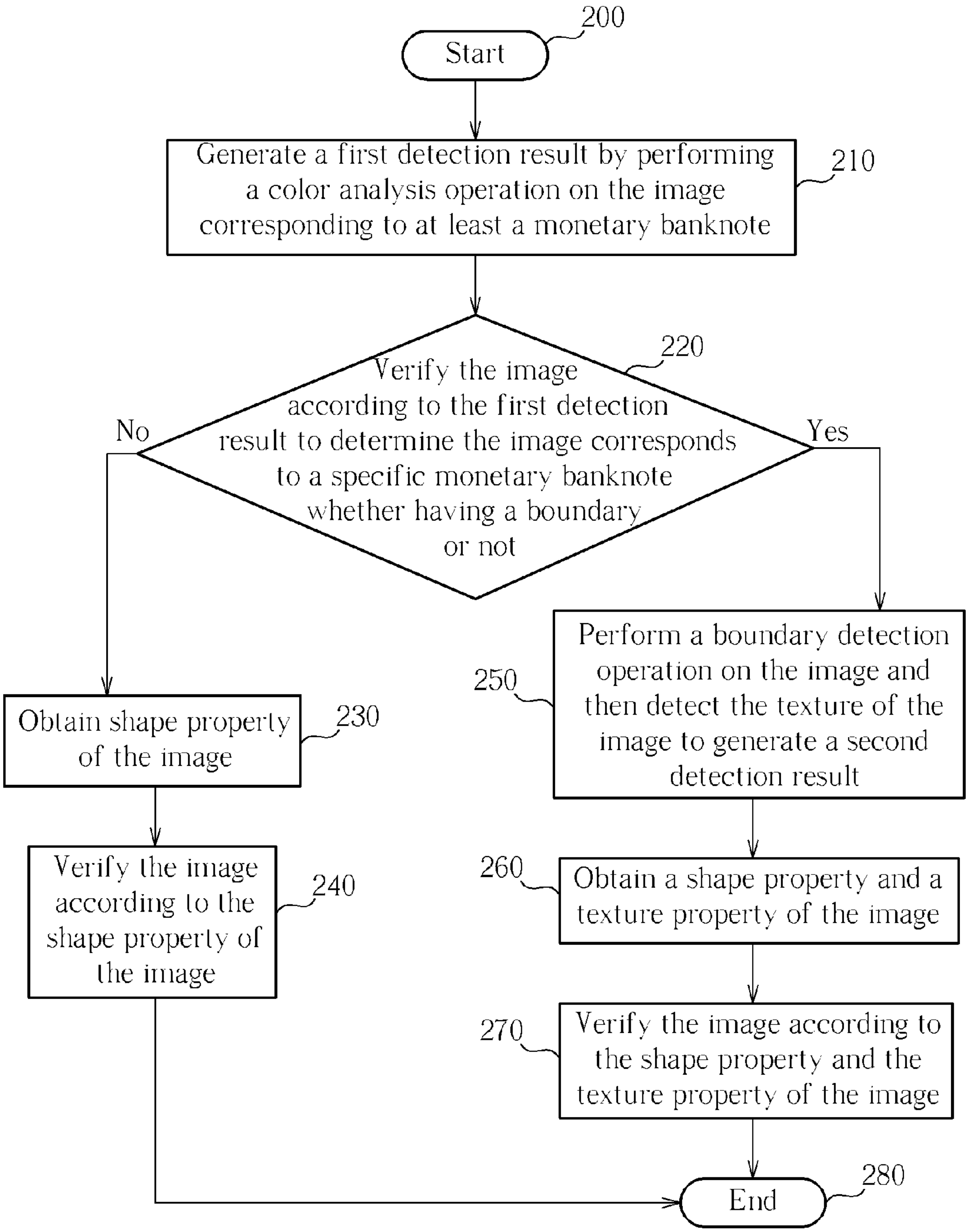
FIG. 3 is a flowchart of a low-level detection procedure in the present invention method in accordance with an embodiment of the present invention.

Please refer to FIG. 3. FIG. 3 is a flowchart of the low-level detection procedure in the present invention method in accordance with an embodiment of the present invention. Provided that substantially the same result is achieved, the steps of this process need not be in the exact order shown and need not be contiguous: other steps can be intermediate. The low-level detection procedure in the present invention method comprises:

Step 200: Start.

Step 210: Generate a first detection result by performing a color analysis operation on the image corresponding to at least a monetary banknote.

Step 220: Verify the image according to the first detection result. When the first detection result indicates that the image corresponds to a specific monetary banknote having no boundary (such as European, Chinese, or Taiwanese currencies), go to Step 230; when the first detection result indicates that the image corresponds to a specific monetary banknote having a boundary (such as American or Japanese currencies), go to Step 250.

Step 230: Obtain a shape property of the image.

Step 240: Verify the image according to the shape property of the image.

Step 250: Perform a boundary detection operation on the image and then detect the texture of the image to generate a second detection result.

Step 260: Obtain a shape property and a texture property of the image.

Step 270: Verify the image according to the shape property and the texture property of the image.

Step 280: End.

Figure 4:
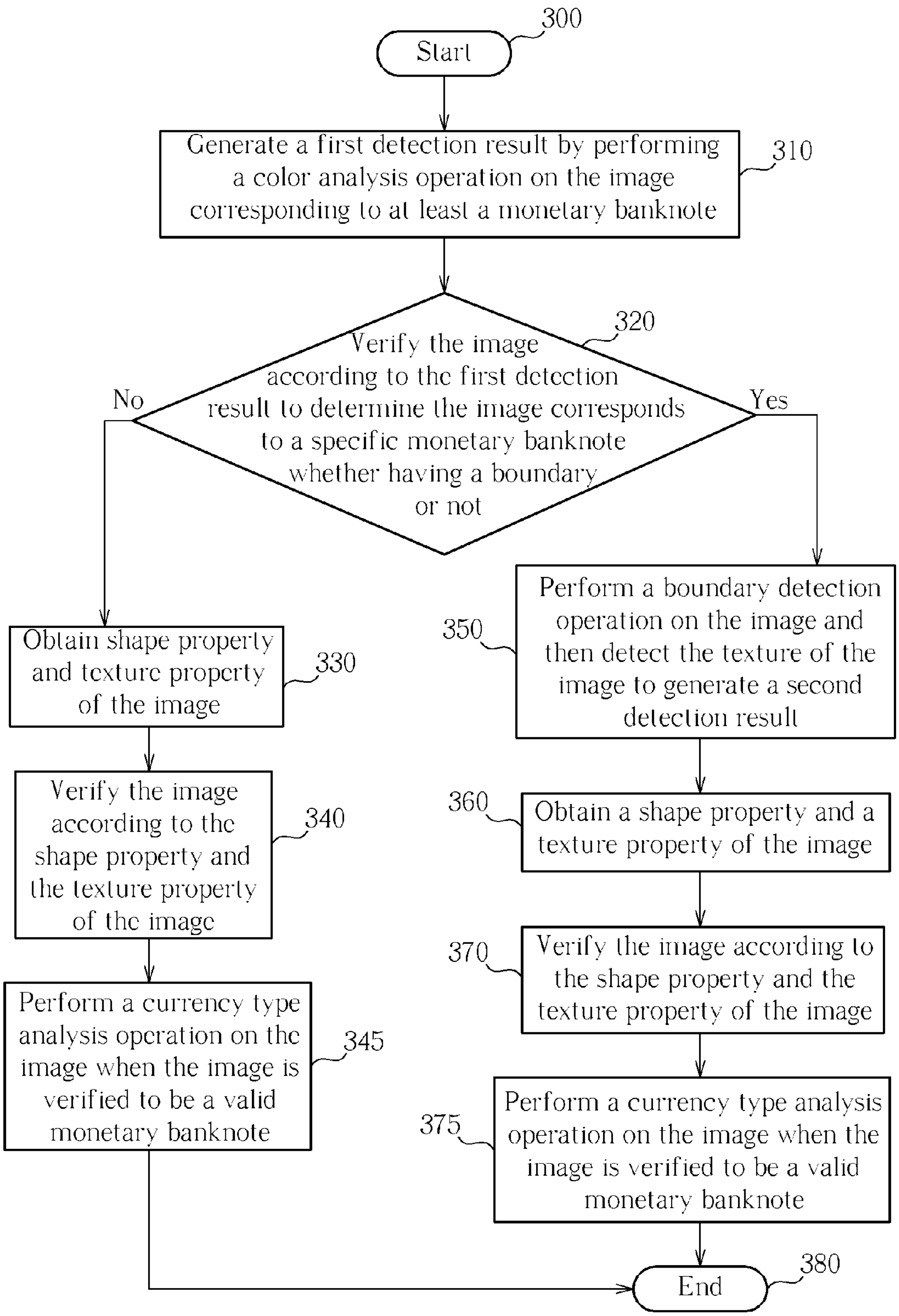
FIG. 4 is a flowchart of a middle-level detection procedure in the present invention method in accordance with an embodiment of the present invention.

Please refer to FIG. 4. FIG. 4 is a flowchart of the middle-level detection procedure in the present invention method in accordance with an embodiment of the present invention. Provided that substantially the same result is achieved, the steps of process need not be in the exact order shown and need not be contiguous; that is, other steps can be intermediate. The middle-level detection procedure in the present invention method comprises:

Step 300: Start.

Step 310: Generate a first detection result by performing a color analysis operation on the image corresponding to at least a monetary banknote.

Step 320: Verify the image according to the first detection result. When the first detection result indicates that the image corresponds to a specific monetary banknote having no boundary (such as European, Chinese, or Taiwanese currencies), go to Step 330; when the first detection result indicates that the image corresponds to a specific monetary banknote having a boundary (such as American or Japanese currencies), go to Step 350.

Step 330: Obtain a shape property and a texture property of the image.

Step 340: Verify the image according to the shape property and the texture property of the image.

Step 345: Perform a currency type analysis operation on the image when the image is verified to be a valid monetary banknote.

Step 350: Perform a boundary detection operation on the image and then detect the texture of the image to generate a second detection result.

Step 360: Obtain shape property and texture property of the image

Step 370: Verify the image according to the shape property and the texture property of the image.

Step 375: Perform a currency type analysis operation on the image when the image is verified to be a valid monetary banknote.

Step 380: End.

Figure 5:
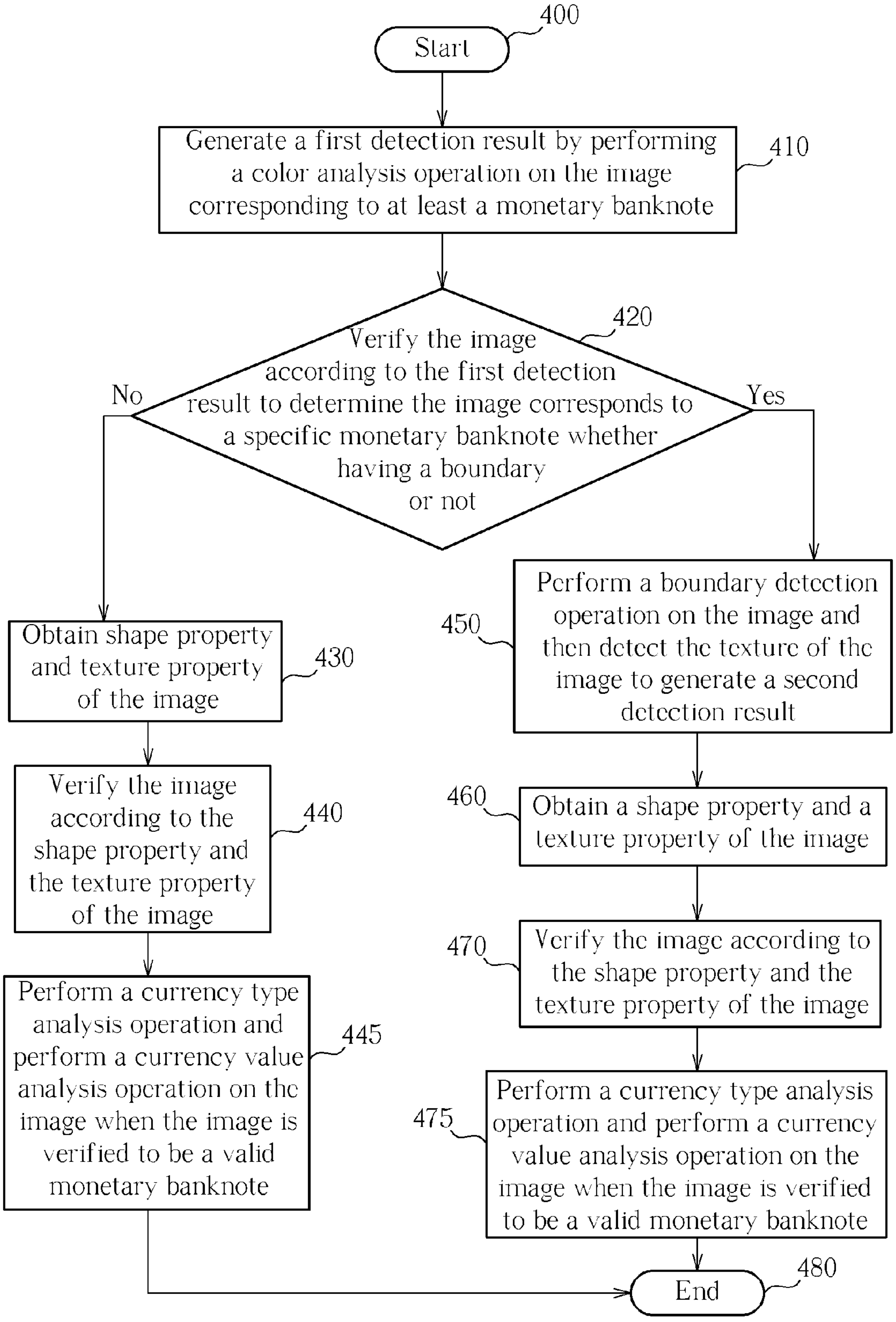
FIG. 5 is a flowchart of a high-level detection procedure in the present invention method in accordance with an embodiment of the present invention.

Please refer to FIG. 5. FIG. 5 is a flowchart of the high-level detection procedure in the present invention method in accordance with an embodiment of the present invention. Provided that substantially the same result is achieved, the steps of process need not be in the exact order shown and need not be contiguous: other steps can be intermediate. The high-level detection procedure in the present invention method comprises:

Step 400: Start.

Step 410: Generate a first detection result by performing a color analysis operation on the image corresponding to at least a monetary banknote.

Step 420: Verify the image according to the first detection result. When the first detection result indicates that the image corresponds to a specific monetary banknote having no boundary (such as European, Chinese, or Taiwanese currencies), go to Step 430; when the first detection result indicates that the image corresponds to a specific monetary banknote having a boundary (such as American or Japanese currencies), go to Step 450.

Step 430: Obtain a shape property and a texture property of the image.

Step 440: Verify the image according to the shape property and the texture property of the image.

Step 445: Perform a currency type analysis operation and perform a currency value analysis operation on the image when the image is verified to be a valid monetary banknote.

Step 450: Perform a boundary detection operation on the image and then detect the texture of the image to generate a second detection result.

Step 460: Obtain a shape property and a texture property of the image

Step 470: Verify the image according to the shape property and the texture property of the image.

Step 475: Perform a currency type analysis operation and perform a currency value analysis operation on the image when the image is verified to be a valid monetary banknote.

Step 480: End.

Figure 6:
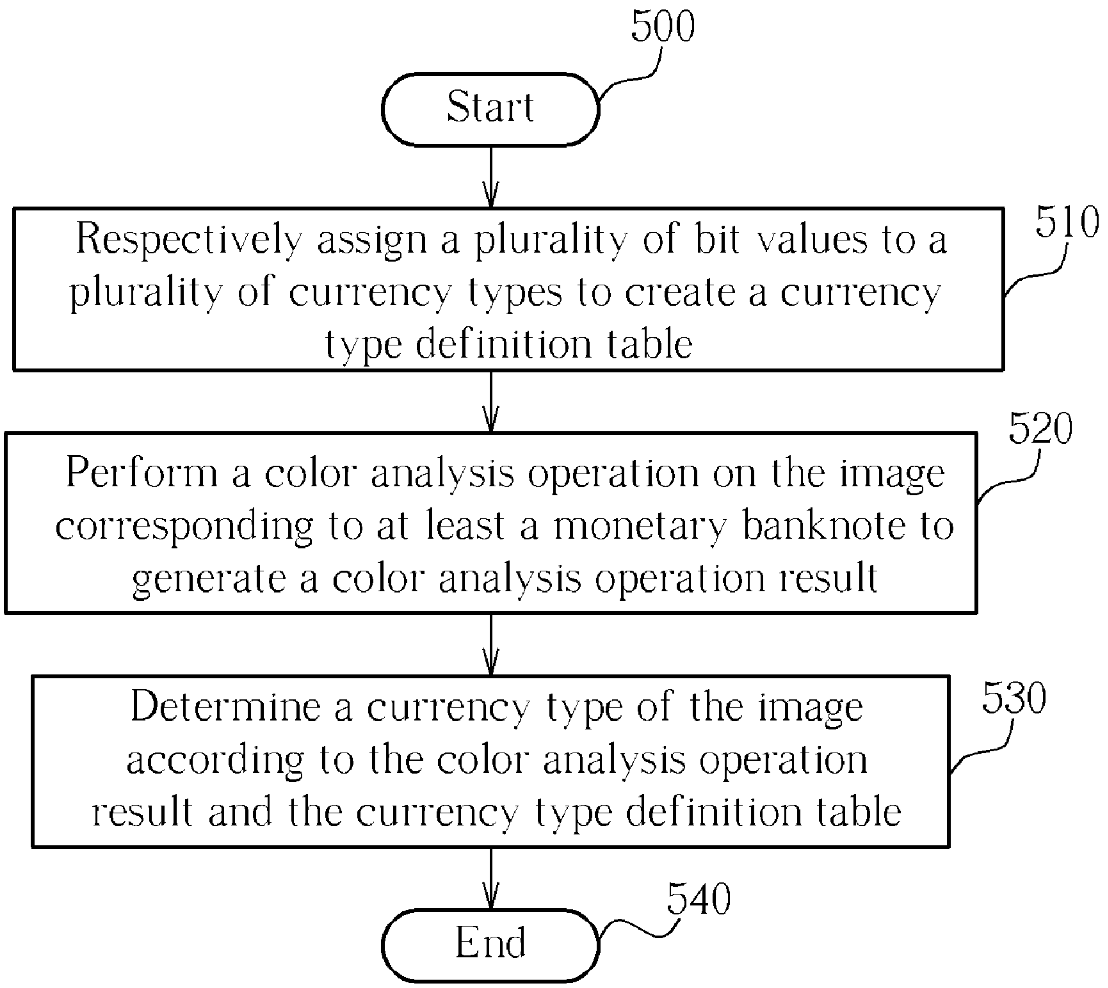
FIG. 6 is a flowchart of a method for performing the currency type analysis operation on the image corresponding to the monetary banknote in accordance with an embodiment of the present invention.

Please refer to FIG. 6. FIG. 6 is a flowchart of a method for performing the currency type analysis operation on the image corresponding to the monetary banknote in accordance with an embodiment of the present invention. Provided that substantially the same result is achieved, the steps of process need not be in the exact order shown and need not be contiguous: other steps can be intermediate. The present invention method comprises:

Step 500: Start.

Step 510: Respectively assign a plurality of bit values to a plurality of currency types to create a currency type definition table.

Step 520: Perform a color analysis operation on the image corresponding to at least a monetary banknote to generate a color analysis operation result.

Step 530: Determine a currency type of the image according to the color analysis operation result and the currency type definition table.

Step 540: End.

Please refer to FIG. 7. FIG. 7 shows an illustration of a bit-wise currency type definition table. When the bit-wise currency type definition table is utilized in the present invention, it is obvious that different currency types can be recognized according to the different bit values. In a color analysis module, at first the whole image is analyzed block by block for the color pattern match and a combined blocked image is obtained. In the blocked image, the value is obtained through the "OR" bit operation when the block is compared with the look-up table, as the target block may be assigned to many currencies (USD, JPY, EURO etc.). One pixel in the blocked image (which represents one 8×8 block of the input image) may represent several currency types, so the present invention method must extract the blocked image of each type to do further analysis, such as the final determination of the currency type.

In next step, an "AND" bit operation is used to extract each type of the blocked image. In addition, the texture property gray-level variance is used at the same time. After that, for each type of blocked image the isolated noise is removed by a super-block analysis. And then an intersected analysis among all the defined types of blocked images is used to remove the intersection area between some types. Basically, at this point, the currency type has been differentiated, but as there may be some false detection in each type of blocked image, several additional steps are used, such as small regional removal by object area criterion, monetary banknotes regional filter and so on.

Although most currency types can be determined from the color output, there is the possibility of a false positive. So, the detailed texture analysis and global verification are processed. After that, the verified region combing color output is used to figure out the currency type.

As some different currency types share the same bit in the definition table, the present invention method is to select specific colors to represent each currency and to check the suspicious region whether there are enough such blocks with the pre-specified colors. Please note that the above embodiments are only for illustrative purposes and are not meant to be limitations of the present invention.

Briefly summarized, use of the present invention method not only provides an increased means of security measures when used for counterfeit banknote detection, it also provides ease of integration with common hardware devices and a viable low cost approach. Accurate detection rates with low false detection frequencies can therefore be attained. The method is also robust and flexible enough to be applied to different image types and conditions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting an image corresponding to at least a monetary banknote and performing a currency type analysis operation on the image, comprising:

selecting a detection procedure from a plurality of different detection procedures;

verifying the image according to the selected detection procedure;

respectively assigning a plurality of bit values to a plurality of currency types to create a currency type definition table;

performing a color analysis operation on the image to generate a color analysis operation result; and determining a currency type of the image according to the color analysis operation result and the currency type definition table.

2. The method of claim 1, wherein the plurality of different detection procedures comprises a low-level detection procedure for determining whether the monetary banknote is a currency or not, a middle-level detection procedure for determining a currency type of the monetary banknote, and a high-level detection procedure for determining a currency type and a currency value of the monetary banknote.

3. The method of claim 2, wherein the low-level detection procedure comprises:

generating a first detection result by performing a color analysis operation on the image; and verifying the image according to the first detection result.

4. The method of claim 3, wherein the step of verifying the image according to the first detection result comprises:

when the first detection result indicates that the image corresponds to a specific monetary banknote having no boundary, obtaining a shape property of the image; and verifying the image according to the shape property of the image.

5. The method of claim 4, wherein the specific monetary banknote comprises European currency, Chinese currency, or Taiwanese currency.

6. The method of claim 3, wherein the step of verifying the image according to the first detection result comprises:

when the first detection result indicates that the image corresponds to a specific monetary banknote having a boundary, performing a boundary detection operation on the image and then detecting a texture of the image to generate a second detection result;

when the second detection result indicates that the image corresponds to the specific monetary banknote, obtaining a shape property and a texture property of the image; and verifying the image according to the shape property and the texture property of the image.

7. The method of claim 6, wherein the specific monetary banknote comprises American currency or Japanese currency.

8. The method of claim 2, wherein the middle-level detection procedure comprises:

generating a first detection result by performing a color analysis operation on the image;

when the first detection result indicates that the image corresponds to a specific monetary banknote having no boundary, obtaining a shape property and a texture property of the image;

verifying the image according to the shape property and the texture property of the image; and when the image is verified to be a valid monetary banknote, performing a currency type analysis operation on the image.

9. The method of claim 8, wherein the specific monetary banknote comprises European currency, Chinese currency, or Taiwanese currency.

10. The method of claim 2, wherein the middle-level detection procedure comprises:

generating a first detection result by performing a color analysis operation on the image;

when the first detection result indicates that the image corresponds to a specific monetary banknote having a boundary, performing a boundary detection operation on the image to generate a second detection result;

when the second detection result indicates that the image corresponds to the specific monetary banknote, obtaining a shape property and a texture property of the image;

verifying the image according to the shape property and the texture property of the image; and when the image is verified to be a valid monetary banknote, performing a currency type analysis operation on the image.

11. The method of claim 10, wherein the specific monetary banknote comprises American currency or Japanese currency.

12. The method of claim 2, wherein the high-level detection procedure comprises:

generating a first detection result by performing a color analysis operation on the image;

when the first detection result indicates that the image corresponds to a specific monetary banknote having no boundary, obtaining a shape property and a texture property of the image;

verifying the image according to the shape property and the texture property of the image;

when the image is verified to be a valid monetary banknote, performing a currency type analysis operation on the image and performing a currency value analysis operation on the image.

13. The method of claim 12, wherein the specific monetary banknote comprises European currency, Chinese currency, or Taiwanese currency.

14. The method of claim 2, wherein the high-level detection procedure comprises:

generating a first detection result by performing a color analysis operation on the image;

when the first detection result indicates that the image corresponds to a specific monetary banknote having a boundary, performing a boundary detection operation on the image to generate a second detection result;

when the second detection result indicates that the image corresponds to the specific monetary banknote, obtaining a shape property and a texture property of the image;

verifying the image according to the shape property and the texture property of the image; and when the image is verified to be a valid monetary banknote, performing a currency type analysis operation on the image and performing a boundary detection operation on the image.

15. The method of claim 14, wherein the specific monetary banknote comprises American currency or Japanese currency.

16. The method of claim 1, further comprising:

performing a down-sampling operation on the image.

17. The method of claim 1, wherein the currency type definition table is a bit-wise currency type definition table.

18. A method for performing a currency type analysis operation on an image corresponding to at least a monetary banknote, the method comprising:

respectively assigning a plurality of bit values to a plurality of currency types to create a currency type definition table;

performing a color analysis operation on the image to generate a color analysis operation result; and determining a currency type of the image according to the color analysis operation result and the currency type definition table.

19. The method of claim 18, wherein the currency type definition table is a bit-wise currency type definition table.

20. The method of claim 18, wherein the monetary banknote comprises European currency, Chinese currency, Taiwanese currency, American currency, or Japanese currency.

* * * * *